United States Patent
Brookins et al.

(10) Patent No.: US 7,840,941 B2
(45) Date of Patent: Nov. 23, 2010

(54) CONFLICT RESOLUTION OF SOFTWARE CUSTOMIZATIONS BASED ON PRODUCT DEPENDENCIES

(75) Inventors: Timothy J. Brookins, West Fargo, ND (US); Jason A Huck, Fargo, ND (US); Paul R. Bramel, Fargo, ND (US); David S. Froslie, Fargo, ND (US)

(73) Assignee: Microsoft Corporation, Redmond, WA (US)

( * ) Notice: Subject to any disclaimer, the term of this patent is extended or adjusted under 35 U.S.C. 154(b) by 1118 days.

(21) Appl. No.: 11/515,256

(22) Filed: Sep. 1, 2006

(65) Prior Publication Data
US 2008/0127087 A1    May 29, 2008

(51) Int. Cl.
*G06F 9/44* (2006.01)
(52) U.S. Cl. ...................................... 717/121
(58) Field of Classification Search .................. None
See application file for complete search history.

(56) References Cited

U.S. PATENT DOCUMENTS

| | | | |
|---|---|---|---|
| 5,590,270 A | 12/1996 | Tsukuda | 717/121 |
| 5,867,709 A | 2/1999 | Klencke | 717/111 |
| 6,199,204 B1 | 3/2001 | Donohue | 717/178 |
| 6,715,144 B2 | 3/2004 | Daynes et al. | 717/174 |
| 6,725,452 B1 | 4/2004 | Te'eni et al. | 717/168 |
| 7,013,461 B2 | 3/2006 | Hellerstein et al. | 717/177 |
| 2002/0154555 A1 | 10/2002 | Krueger | 365/200 |
| 2006/0123414 A1 | 6/2006 | Fors | 717/177 |
| 2006/0143148 A1 | 6/2006 | Degtyar | 707/1 |

OTHER PUBLICATIONS

Stan Jarzabek et al., "Handling Variants in Component-based Product Lines with XVCL: a Case Study" Department of Computer Science, School of Computing, National University of Singapore, pp. 1-27.
FlexNet AdminStudio, 4 pages.

*Primary Examiner*—Wei Y Zhen
*Assistant Examiner*—Lanny Ung
(74) *Attorney, Agent, or Firm*—Joseph R. Kelly; Westman, Champlin & Kelly, P.A.

(57) ABSTRACT

Customizations are applied to a software product by determining whether any of the customizations to be applied are in conflict with one another. If so, product dependency information, which identifies a product that the customizations are based on, is used to reduce a number of conflicting customizations to be made to the software product. Any remaining conflicts are resolved, and the customizations are applied.

16 Claims, 8 Drawing Sheets

CONFLICT RESOLUTION OF SOFTWARE CUSTOMIZATIONS BASED ON PRODUCT DEPENDENCIES

BACKGROUND

A software product is typically developed with a base set of functionality which is accomplished by the software code, resources and metadata. This product (along with its code, resources and metadata) is typically referred to as the base product.

Certain difficulties arise when the base product, or any derivation of the base product, is customized. Customizations can occur, for example, when a software developer builds an add-on to a base product that has already been released. Such add-ons may be developed to extend or otherwise customize the base product, and the changes made to the base product are referred to as customizations.

It may happen that multiple different add-ons or other customizations are developed for the same base product. A customization conflict can arise when a single element in the base product is customized by two different customizations. When two or more different customizations contain modifications to the same base product element, they are said to be in conflict. In order to resolve such a conflict, the modifications to the base product element contained in only one of the customizations must be chosen and applied to the base product element.

It may also happen that a developer may develop an add-on or other customization of a product that is, itself, a customization of a base product. Therefore, the problem of which customization to apply in a conflict situation, especially where customizations are being made to an already-customized product can be fairly complicated.

The discussion above is merely provided for general background information and is not intended to be used as an aid in determining the scope of the claimed subject matter.

SUMMARY

Customizations are applied to a software product by first determining whether any of the customizations to be applied are in conflict with one another. If so, product dependency information is accessed. The product dependency information identifies a product which the customizations are based on. The product dependency information is used to reduce a number of conflicting customizations to be made to the software product. Any remaining conflicts are resolved, and the customizations are applied.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 3 illustrates an exemplary metadata tree with conflicting customizations, but which also depend on, and identify, a parent product which the customizations are based on.

DETAILED DESCRIPTION

Figure 1:
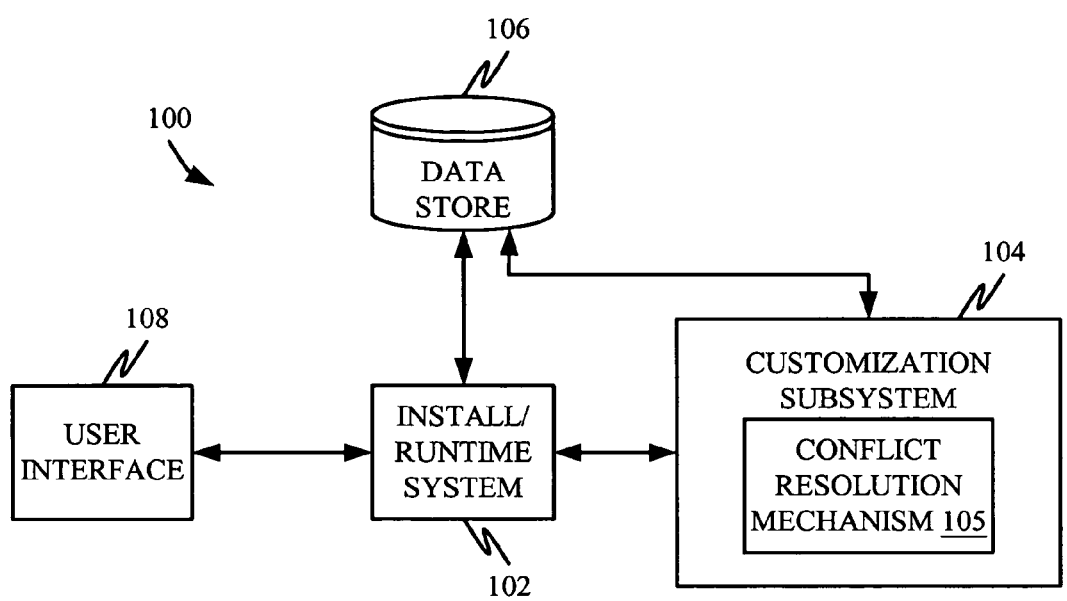
FIG. 1 is a block diagram of one environment in which customizations can be made.

FIG. 1 illustrates a block diagram of a system 100 in which a software product is installed and run. System 100 includes install/runtime system 102, customization subsystem 104, data store 106 and user interface 108. In an embodiment in which system 100 is used to run a software product, install/runtime system 102 loads the software product from data store 106. Customization subsystem 104 then determines whether the software product has been customized. In doing so, subsystem 104 accesses data store 106 (or a separate data store) that stores customization values for the software product, if any have been made. Customization subsystem 104 then determines whether there are any conflicting customizations, and if so, it resolves those conflicts using conflict resolution mechanism 105. The customizations are then applied to the software product that has been loaded by system 102, such that the customized software product can be run.

It will also be noted, however, that some customizations are created or applied (or both) while the software product is running. If runtime context is necessary for the customizations to be applied, then customization conflicts are resolved and the customizations are applied by customization subsystem 104 during runtime. For instance, it may be that an individual user has made certain customizations to be applied in certain contexts, only for that user. In that case, customization subsystem 104 can only apply the customization once the appropriate runtime context has been identified, and once the individual user is known. Thus, customization subsystem 104 will apply customizations during runtime as well.

In addition, in some cases, customizations are created or applied at the time the software product is installed. This may be the case, for instance, where a developer has developed a product that extends or is added onto, the base software product. Thus, customization subsystem 104 identifies customizations to be applied during installment of the software product, identifies any conflicts in those customizations, resolves those conflicts, and applies the customizations when necessary.

Figure 2:
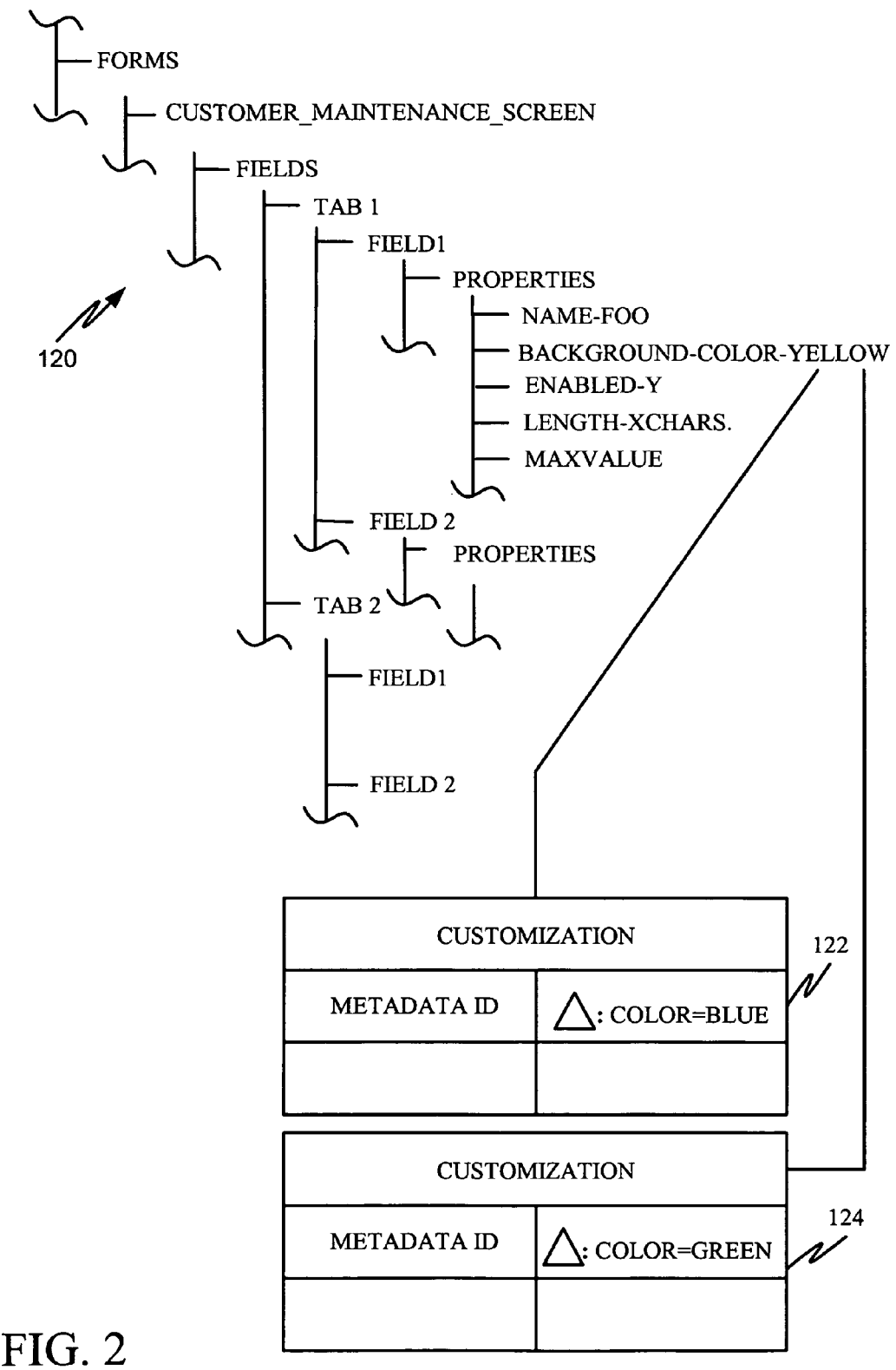
FIG. 2 is a diagram of an exemplary metadata tree with conflicting customizations.

FIG. 2 shows one simple example of a metadata customization conflict. FIG. 2 shows a metadata structure 120 which is a portion of a metadata structure tree. It will be appreciated that the portion of tree 120 shown in FIG. 2 is illustratively but a very small portion of a much larger tree that defines metadata for an application run on the system 100 shown in FIG. 1.

The portion of tree 120 shown in FIG. 2 illustrates that the metadata includes a Forms section which itself includes a Customer_Maintenance_Screen. The Customer_Maintenance_Screen includes Fields which have a plurality of Properties, including the Field name, the background color for the Field, the length of the Field, and the height of the Field. Of course, the Field can have a plurality of additional or different properties as well. Metadata structure 120 is stored in a metadata store, such as a portion of data store 106 shown in FIG. 1, or another data store.

In order to customize metadata structure 120, a user can input a customization specification through user interface 108, in system 102, to customization system 104. Of course, the customization can be input directly to customization subsystem 104 as well.

In the embodiment shown in FIG. 2, the customizations to tree 120 are shown in the form of delta values. A delta value represents a change in the metadata structure 120 from its original form. A customization can contain any number, N, of delta values, each delta value representing a specific change relative to a known instance of base code embodying a base product. Further, the delta value need not simply represent a change to an existing code. Instead, the delta value can represent the addition of a new node in the metadata structure 120.

As an example of customizing a metadata value, in the original data structure 120, the background color for the field having a name "foo" is yellow. Assume that a user wishes to change the background color to blue. In that instance, the user will have made a single customization containing a single delta value. The customization is relative to the field "foo" of the Customer_Maintenance_Screen. The customization can be stored in a separate part of the metadata store, or in a separate data store, or otherwise.

In the embodiment shown in FIG. 2, the customization value is shown in tabular form. A table 122 that can form a part of the metadata store or other data store contains a metadata ID identifying the background color property of the Field in the Customer_Maintenance_Screen portion of the Forms. Table 122 also includes delta information that identifies the delta value, that being that the background color of a field is changed to blue. Thus, the delta value is not a copy of the source that has been modified. Instead, it is only a specification of which value in structure 120 should be modified. By only tracking delta values for customizations, it is possible for many modifications to be dynamically applied to a base product. It will be noted that the data information is shown in a table, but any other structure could be used as well.

FIG. 2 also shows a conflicting customization. Table 124 shows that the delta value for the background color has been changed to green. Therefore, in the exemplary embodiment shown in FIG. 2, there are conflicting customizations to the background color of the same field of the same form. One customization specifies that the background color be changed to blue, while the other customization specifies that the background color be changed to green.

In order to apply the customizations to the background color, assume that the customizations are to be applied during loading of the Form. Further, assume that the user has requested the Customer_Maintenance_Screen to be displayed. Customization subsystem 104 accesses data store 106 and finds that there are indeed customizations to be made to the Customer_Maintenance_Screen. Unfortunately, however, those customizations are in conflict, in that they indicate two different colors for the background of the same field.

Customizations are developed with knowledge of the base product. In other words, it is likely that a user that customizes the background value of a field in a form has knowledge of the value being customized. Additionally, some customizations may be developed with knowledge of other customizations that have already been made to the base product. For instance, it may well be that the user who generated the customization in table 124, specifying that the background color should be green, already knew that a prior version of the code included the customization shown in table 122, specifying that the background color be blue. In that case, it can be said that the customization in table 124 depends on the customization made in table 122. The customization in table 122 is thus referred to as the parent of that in table 124.

If the customization subsystem 104 had a way of knowing that the customization made in table 124 was made with knowledge of the preceding customization shown in table 122 (i.e., it was dependent on the customization in table 122), then there would in actuality be no conflict. Instead, customization subsystem 104 would know that the user requesting customization in table 124 based that customization on the customization in table 122. Thus, the customization in table 124 would take precedence and be applied.

Figure 3:
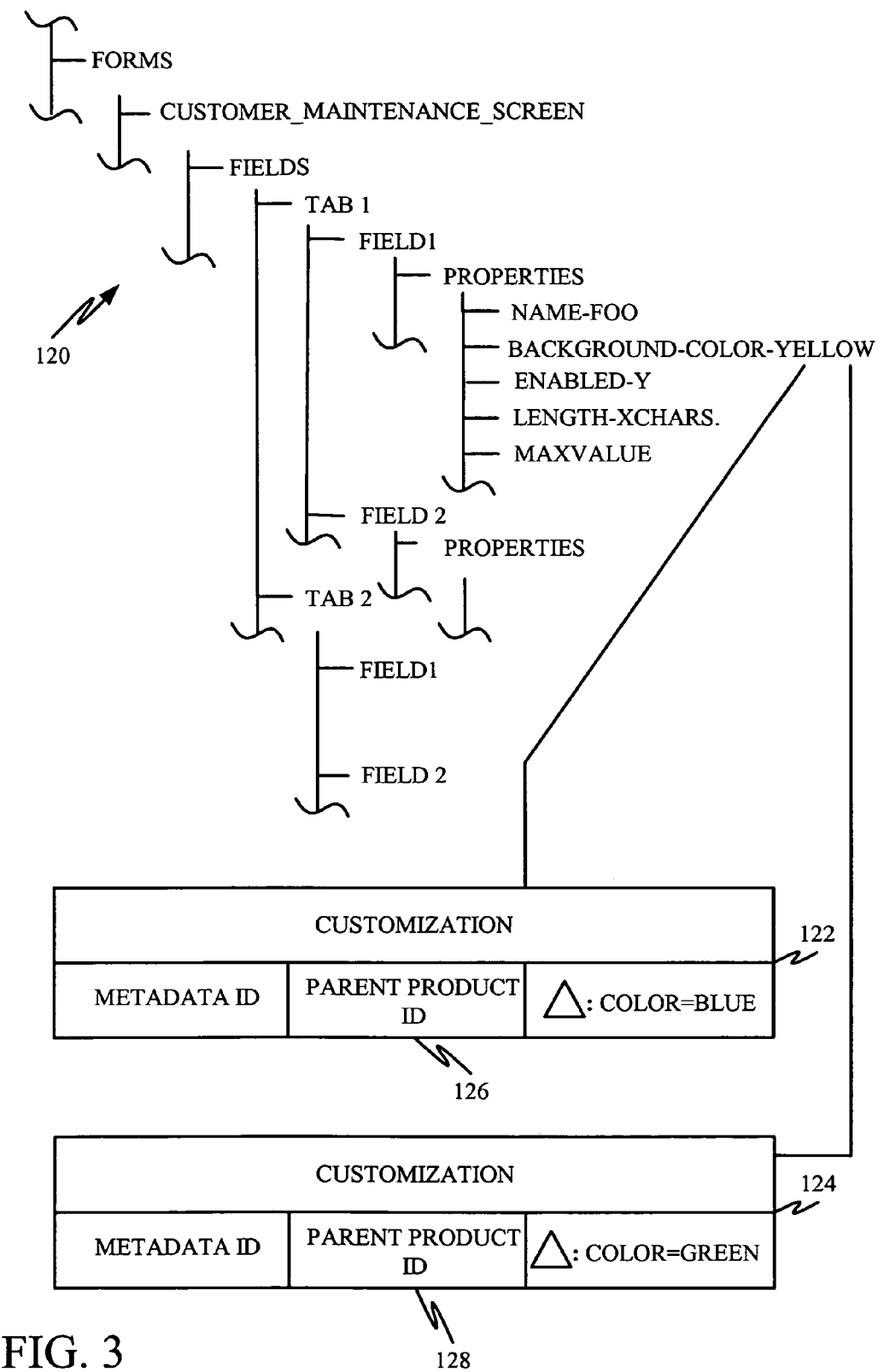

FIG. 3 shows metadata tree structure 120, with the delta values shown in FIG. 2, but with tables 122 and 124 containing dependency information as well. Tables 122 and 124 now contain parent product identification information referred to as the "parent product ID" which identifies the product which was modified by the delta value in the customization table. In the present example, the parent product ID 126 in table 122 will illustratively identify the base product in the original metadata tree structure 120. The parent product ID 128 in table 124, on the other hand, will identify the parent product, as modified by the customization shown in table 122. Thus, it will be clear from table 124 that the customizations residing therein already take into account the customizations in table 122. It will also be noted that a customization can depend on more than one parent (as is described below), in which case both parents are identified by a parent product ID.

Figure 4:
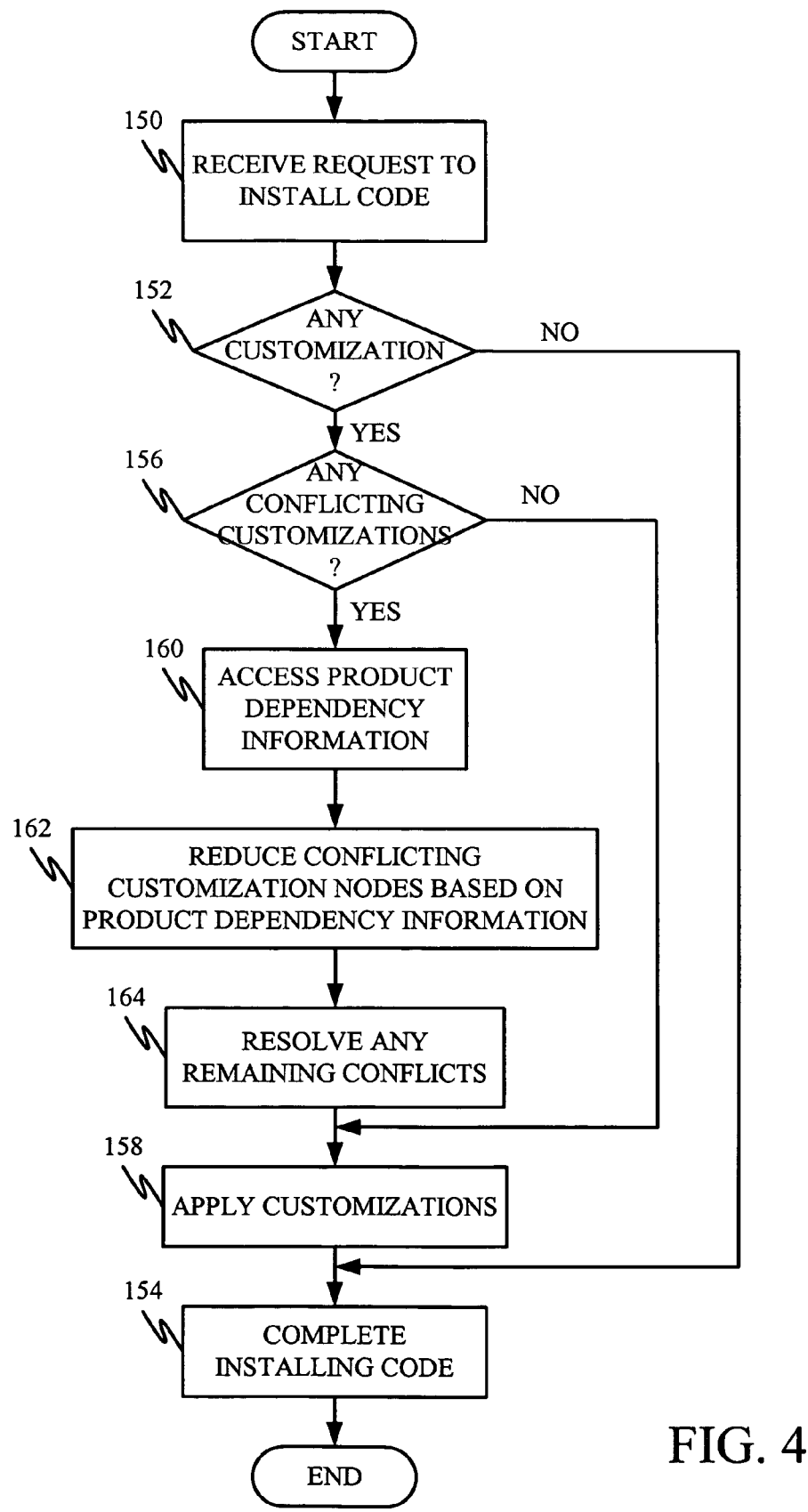
FIG. 4 is a flow diagram illustrating how customizations can be made in accordance with one embodiment.

FIG. 4 thus illustrates a flow diagram showing one illustrative embodiment of the operation of customization subsystem 104 shown in FIG. 1, utilizing the customization dependency information in tables 122 and 124 shown in FIG. 3. In accordance with an install embodiment shown in FIG. 4, install/runtime system 102 first receives a request to install a customization. This is indicated by block 150 in FIG. 4. Next, customization subsystem 104 is invoked to determine whether the code is to be customized or targeted by any other customizations as well. This is indicated by block 152. If not, of course, then the customization is installed and installation is complete as indicated by block 154.

However, if at block 152 it is determined that there are customizations to apply, then customization subsystem 104 determines whether any of the customizations are in conflict with one another. This is indicated by block 156. This can be done in a relatively straight forward embodiment by determining whether any customizations try to customize the same application element to different values. Of course, other more complex methods can be used as well. For instance, if a form has a width property, a height property and a width:height ratio property, customizations to width and height might be in conflict. These types of conflicts can be detected by any desired mechanism for checking such interdependency.

In any case, if there are customizations to be made, but the customizations are not in conflict in any way, then the customizations are simply applied. This is indicated by block 158 in FIG. 4.

However, if, at block 156, subsystem 104 determines that there are conflicting customizations to be made, then subsystem 104 uses conflict resolution mechanism 105 to access the product dependency information (such as information 126 and 128 in tables 122 and 124). This is indicated by block 160 in FIG. 4. Conflict resolution mechanism 105 of customization subsystem 104 uses this dependency information to determine whether the number of actually conflicting customization nodes can be reduced. In other words, mechanism 105 uses the product dependency information 128 to determine that the customization in table 124 was made with prior knowledge of the customization made in table 122. Therefore, mechanism 105 can determine that the customization values in tables 122 and 124 are actually not in conflict. Instead, the customization value identified in table 124 can be applied without reference to any further conflict resolution mechanisms. Reducing the number of actually conflicting customization nodes based on the product dependency information is indicated by block 162 in FIG. 4.

It may happen that the same application element is customized to two different values, by customizations which had no knowledge of one another. In that case, there may still remain some customization conflicts that must be resolved. If so, customization subsystem 104 illustratively accesses an alternate conflict resolution mechanism (such as alternate conflict resolution mechanism 107 shown in FIG. 1) to resolve any of the remaining conflicts. This is indicated by block 164 in FIG. 4. In one embodiment, the alternate conflict resolution mechanism 107 is a rules-based mechanism that applies certain conflict resolution rules to customization conflicts in order to choose one of the conflicting customizations to apply to the code. Of course, any other customization mechanisms, such as statistical mechanisms, role-based mechanisms, etc. can be used.

One illustrative runtime embodiment is similar to the runtime embodiment just described. However, the runtime embodiment begins with a request for a piece of metadata, such as a form. When the form is retrieved, so are its customizations. The customization subsystem then processes the customizations, looking for, reducing, and resolving conflicts as set out above.

Figure 5:
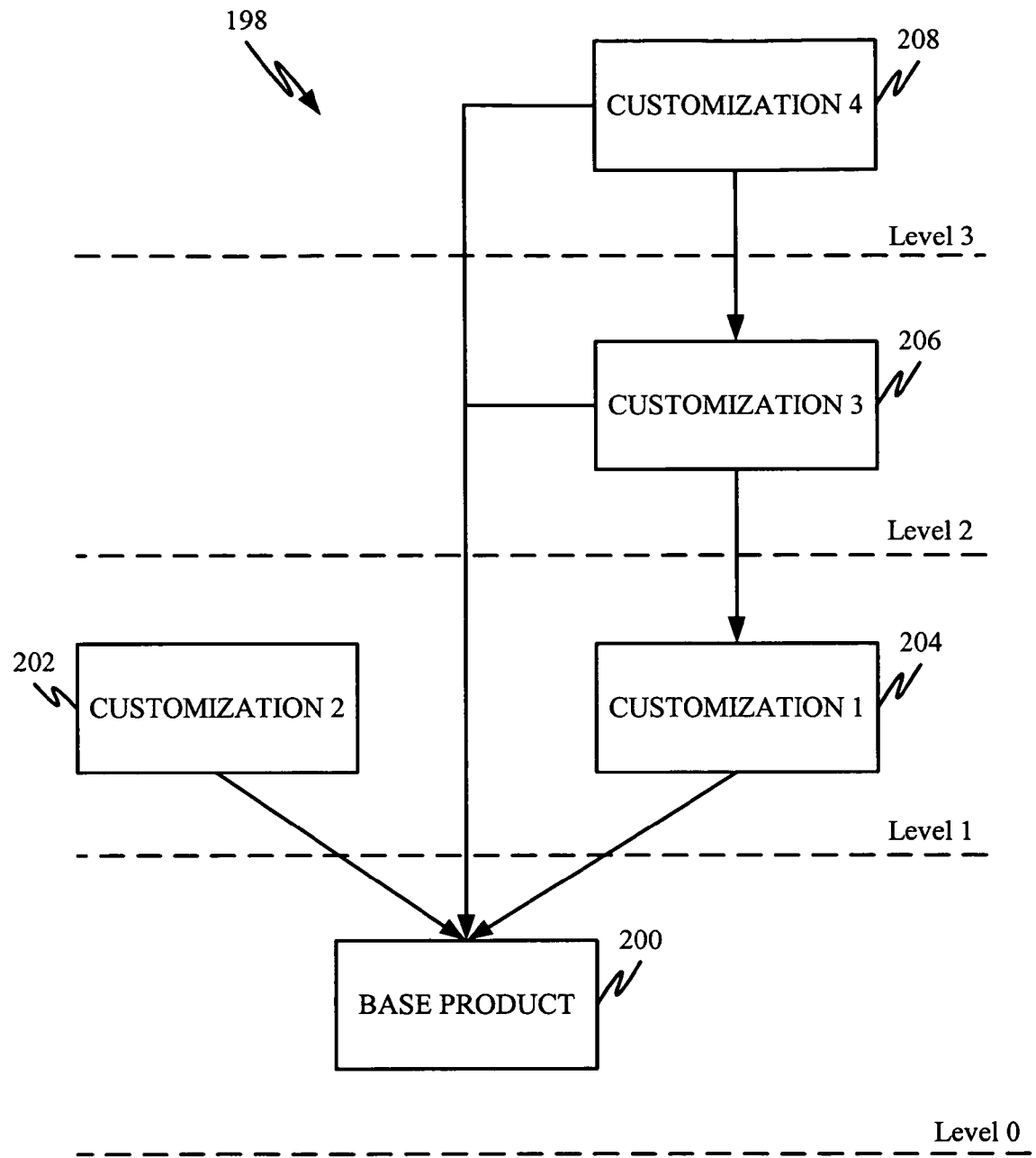
FIG. 5 shows an exemplary dependency graph.

In one illustrative embodiment, customizations can be thought of as being developed in levels where the level of a given customization is one higher than the highest level of any customization it depends on, where level 0 contains only the base product. FIG. 5 shows an embodiment of a customization dependency graph 198 which illustrates this in more detail. In FIG. 5, level 0 contains base product 200. Continuing with the example from the previous Figures, base product 200 will illustratively include the original metadata tree structure 120 shown in FIG. 3. Level 1 contains customizations 202 and 204 which depend only on base product 200. For instance, assume that two different developers customize base product 200 independently of one another, and without knowledge of the customizations made by the other. In that case, customizations 202 and 204 would be made only with knowledge of base product 200, and would thus depend directly on base product 200.

Customization 206 is shown depending on both base product 200 and customization 204. Therefore, customization 206 is at level 2 and, because it depends on customization 204, it can be determined that customization 206 was made with knowledge of the customizations already contained in customization 204. In the previous example, shown in FIG. 3, for instance, the customization shown in table 124 identifies through parent product ID 128 that it depends on the customization shown in table 122. Thus, the customization in table 124 is illustratively equivalent to customization 206 shown in FIG. 5. The customization shown in table 122 in FIG. 3 shows through parent product ID 126, that is was made only with knowledge of the base product in the original metadata tree structure 120. Thus, the customization in table 122 is equivalent to customization 204 shown in FIG. 5.

Customization 208 is at level 3 and is shown depending on customization 206 and on base product 200. Therefore, it can be determined that customization 208 was made with knowledge of the customization values in customization 206 which, themselves, were made with knowledge of the customization values in customization 204.

In the illustrative embodiment shown in FIG. 5, the customization dependency graph 198 is a directed acyclic graph. This graph can be constructed and used by customization subsystem 104, in applying customization values, to reduce the number of customization conflicts.

Figure 6:
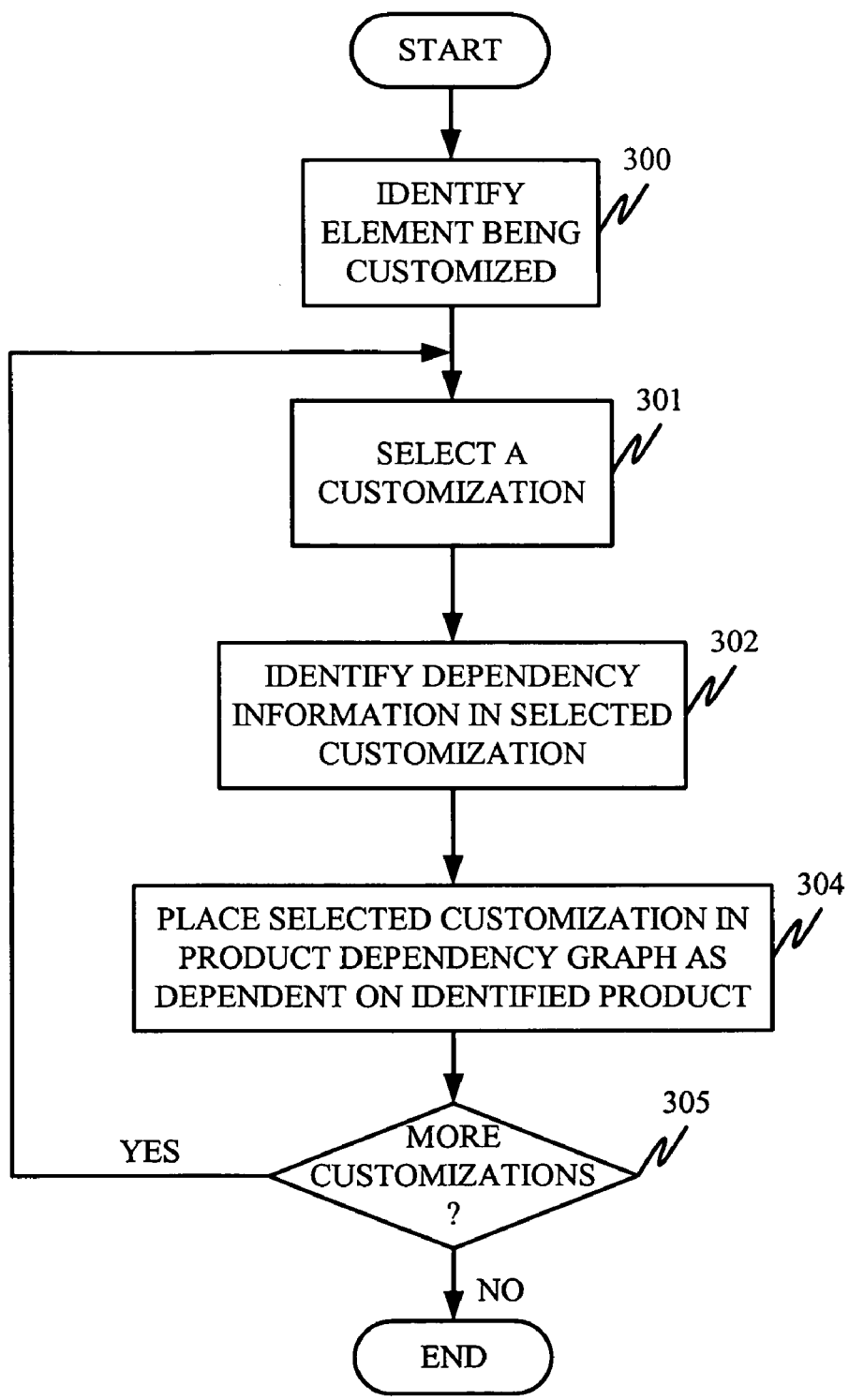
FIG. 6 is a flow diagram illustrating how a dependency graph can be generated in accordance with one embodiment.

FIG. 6 is a flow diagram illustrating one embodiment of the operation of subsystem 104 in generating customization product dependency graph 198. First, any customization that is to be made to a product can be input, and will identify the product being customized. Thus, mechanism 105 in customization subsystem 104 first accesses this information in the customization, to identify the particular product element (e.g., metadata tree node) being customized. This is indicated by block 300 in FIG. 6. In one embodiment, the identity of the product element being customized is stored with the customizations, such as in the assembly references to the customizations, or it can be captured in any other desirable form of metadata.

Mechanism 105 in subsystem 104 then begins to generate graph 198 by selecting one of the customizations to be made to the identified software element. This is indicated by block 301 in FIG. 6.

The selected customization illustratively includes dependency information, such as parent product ID 126 and parent product ID 128 shown in FIG. 3. The dependency information, as described above, illustratively identifies the particular version of the code that is being customized, wherein the version is indicative of an element in the product with a set of customizations already taken into account. Therefore, whether the present customization is based on the base product or on a previous customization, that information will be set out in the dependency information of the customization being input. Identifying the dependency information in the present customization is indicated by block 302 in FIG. 6.

Mechanism 105 in subsystem 104 then places the present customization in the product dependency graph as being dependent on the identified version of the product. For instance, assume that the customization being processed is customization 206 in FIG. 5. If subsystem 104 determines from the product dependency information that customization 206 is dependent on customization 204, then mechanism 105 in subsystem 104 places customization 206 in the product dependency graph, at level 2, as being dependent on the identified product (here base product 200), and the particular version of the product that has been customized (here customization 204). Placing the customization at the proper place in the product dependency graph is indicated by block 304 in FIG. 5. Any more customizations are then processed as indicated by block 305. Once the product dependency graph (such as graph 198 in FIG. 5) has been constructed for the customizations, subsystem 104 can use graph 198 to identify customizations which are actually in conflict, and those which can be readily applied.

Figure 7:
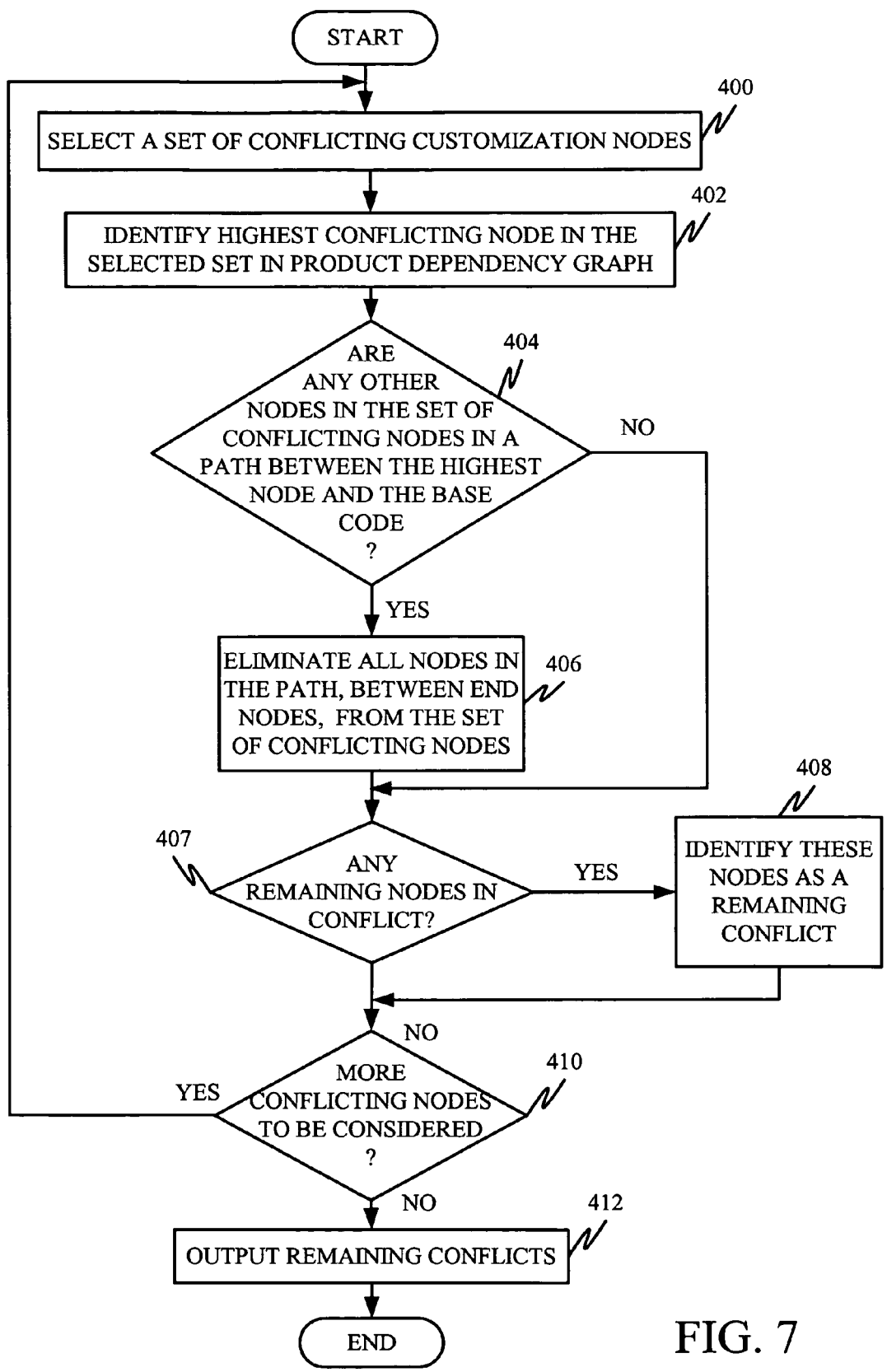
FIG. 7 is a flow diagram illustrating one embodiment in which a number of conflicting customizations are reduced before the customizations are applied.

FIG. 7 shows one flow diagram illustrating one illustrative embodiment of the operation of subsystem 104 in using graph 198. Assume first that mechanism 105 in subsystem 104 has identified that multiple different customizations in graph 198 are specified with respect to the same element of base product 200. These customizations in graph 198 are referred to as conflicting customization nodes. Thus, subsystem 104 first selects a set of conflicting customization nodes. In the example shown in FIG. 5, assume that customizations 204 and 206 both have values which modify the same element of base product 200. Thus, customizations 204 and 206 constitute a set of conflicting customization nodes. Therefore, assume, that subsystem 104 selects nodes 204 and 206 as the set of conflicting customization nodes. This is indicated by block 400 in FIG. 7.

Subsystem 104 then identifies the highest conflicting node, in the selected set of conflicting nodes, in product dependency graph 198. This is indicated by block 402 in FIG. 7. For instance, in the example being discussed, customization 206 is higher than customization 204. Therefore, subsystem 104 identifies customization 206 as being the highest customization node in the set of conflicting nodes.

Subsystem 104 then determines whether any other nodes in the set of conflicting nodes are in a path between the highest node and the base product 200. This is indicated by block 404 in FIG. 7. For instance, it can be seen that the set of conflicting nodes includes nodes 204 and 206. Node 206 has been identified as the highest node in graph 198, and it can be seen that node 204 is in a dependency path between the highest node 206 and the base product 200. Therefore, at block 404 of FIG. 7, mechanism 105 identifies that node 204 is indeed in a dependency path between the highest node (here node 206) and the base product 200.

That being the case, subsystem 104 knows that the customization in node 206 was made with knowledge of the prior customization made in node 204. Thus, mechanism 105 can eliminate all nodes in the path between the highest node and the lowest node, from the set of conflicting nodes. This is indicated by block 406 in FIG. 7. In the present example, mechanism 105 can eliminate the customization in node 204 (which customizes the same element as that in node 206) and thus the customization value set out in node 206 can be applied to base product 200 without regard to the customization value set out in node 204. Thus, the number of actually conflicting customization nodes has been reduced by one, since customization node 204 has been eliminated as a conflict.

It may happen, however, that nodes 202 and 204, which both depend on base product 200, customize the same element of base product 200 with different values. Assume, then, that at block 400 nodes 202 and 204 have been identified as the set of conflicting customization nodes. At block 402, mechanism 105 will identify both nodes 202 and 204 as being at the same highest level in graph 198. At block 404, mechanism 105 will determine that there are no nodes in a dependency path between the highest nodes (202 and 204) and the base product 202, yet there still remains a conflict. Thus, nodes 202 and 204 will be identified as a remaining conflict. This is indicated by blocks 407 and 408 in FIG. 7.

Mechanism 105 then determines whether there are any more conflicting nodes to be considered. This is indicated by block 410.

To further illustrate the example, assume that nodes 204, 206 and 208 all customize the same base product element. Assume further that none of these nodes has yet been eliminated. At block 400, mechanism 105 will eventually select the set of conflicting customization nodes as nodes 204, 206 and 208. At block 402, mechanism 105 will identify node 208 as being at the highest level in dependency graph 198. At block 404, mechanism 105 will identify both nodes 204 and 206 as being in a dependency path between the highest node (node 208) and the base product 200. Therefore, both nodes 204 and 206 can be eliminated as conflicting nodes in block 406. The only remaining customization to the given code element of base code 200 (from the conflicting set of customization nodes 204, 206 and 208) will be that contained in customization node 208, and the other values will not be applied.

Once mechanism 105 has cycled through all of the sets of conflicting customization nodes, it will output any remaining conflicts, that remain after the set of conflicting customization nodes has been reduced through access to dependency graph 198. Outputting the remaining conflicts is indicated by block 412 in FIG. 7. Of course, as indicated with respect to FIG. 4, subsystem 104 resolves the remaining conflicts with an alternate conflict resolution mechanism 107, as desired.

Since none of the customizations in nodes 204, 206 or 208 depend from customization node 202, it can be determined that none of the customizations in nodes 204, 206 and 208 were developed with knowledge of the customization in node 202. Therefore, if the original set of conflicting nodes includes nodes 202, 204, 206 and 208, even after customization nodes 204 and 206 are eliminated, if customization 202 specifies a customization value to the same code element of base product 200 as customization node 208, then customization nodes 202 and 208 remain in conflict as determined by block 407. That remaining conflict is illustratively resolved by access to alternate conflict resolution mechanism 107. In one embodiment, mechanism 107 is a rules based mechanism. In another embodiment, it can be a user interface mechanism that allows a user to provide an input to resolve the conflict, or it can be any other desired resolution mechanism.

It will be noted that a customization can have more than one parent. For example, customization 206 may depend on both customizations 202 and 204. In that case, customization 206 would resolve the conflict between nodes 202 and 204 since it was made with knowledge of both of them.

In another embodiment, the conflicting nodes are not eliminated as in block 406. Instead, once the path of node dependency is identified, the customizations can be applied in reverse-dependency order so that the last customization is the one which prevails and is ultimately applied. For example, in the dependency path that includes nodes 204, 206 and 208, all three customizations can be made, beginning with node 204 and ending with node 208. Thus, the final value for the element being customized will be that set out in node 208.

It will, of course, be understood that while the customization is shown in the present specification with respect to a user interface attribute (i.e., background color), that is an example only and the invention is in no way limited to that type of customization. Instead, the customizations discussed herein can be made to any code element that is customizable. The customizations discussed herein can be made at install time, at load just prior to runtime, or during runtime, or at any other desired time. For instance, the customization subsystem 104 could be run when deploying a customization. In that case, because the subsystem 104 is used prior to runtime, it can be used to identify remaining conflicts that are not automatically resolved. An administrator can then choose between (and resolve) any remaining conflicts if there is no way to automatically resolve those conflicts.

Figure 8:
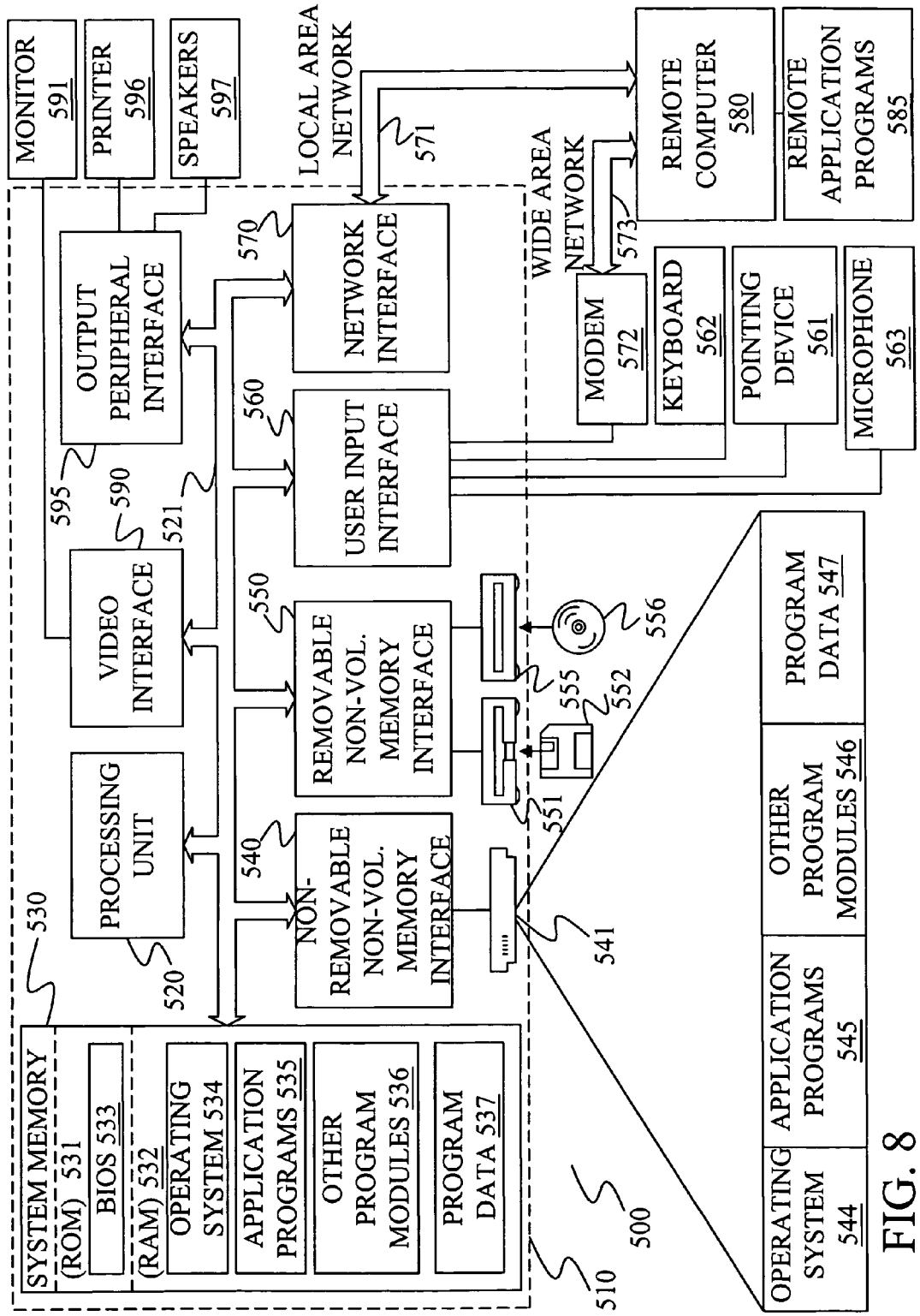
FIG. 8 is a block diagram of one illustrative computing environment.

FIG. 8 illustrates an example of a suitable computing system environment 500 on which embodiments may be implemented. The computing system environment 500 is only one example of a suitable computing environment and is not intended to suggest any limitation as to the scope of use or functionality of the claimed subject matter. Neither should the computing environment 500 be interpreted as having any dependency or requirement relating to any one or combination of components illustrated in the exemplary operating environment 500.

In the embodiment shown, customization subsystem 104 can reside in other program modules 546, or in any other suitable location. In general, modules 546 are described in more detail below.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 8, an exemplary system for implementing some embodiments includes a general-purpose computing device in the form of a computer 510. Components of computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 510 typically includes a variety of computer readable media. Computer readable media can be any available media that can be accessed by computer 510 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 510. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 8 illustrates operating system 534, application programs 535, other program modules 536, and program data 537.

The computer 510 may also include other removable/non-removable volatile/nonvolatile computer storage media. By way of example only, FIG. 8 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media discussed above and illustrated in FIG. 8, provide storage of computer readable instructions, data structures, program modules and other data for the computer 510. In FIG. 8, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies.

A user may enter commands and information into the computer 510 through input devices such as a keyboard 562, a microphone 563, and a pointing device 561, such as a mouse, trackball or touch pad. Other input devices (not shown) may include a joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. In addition to the monitor, computers may also include other peripheral output devices such as speakers 597 and printer 596, which may be connected through an output peripheral interface 595.

The computer 510 is operated in a networked environment using logical connections to one or more remote computers, such as a remote computer 580. The remote computer 580 may be a personal computer, a hand-held device, a server, a router, a network PC, a peer device or other common network node, and typically includes many or all of the elements described above relative to the computer 510. The logical connections depicted in FIG. 8 include a local area network (LAN) 571 and a wide area network (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560, or other appropriate mechanism. In a networked environment, program modules depicted relative to the computer 510, or portions thereof, may be stored in the remote memory storage device. By way of example, and not limitation, FIG. 8 illustrates remote application programs 585 as residing on remote computer 580. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of customizing base software product, comprising:
   obtaining a set of conflicting customizations to be made to a same element of the base software product;
   accessing dependency information associated with each of the conflicting customizations in the set, the dependency information identifying a product upon which the associated conflicting customization is based;
   generating a dependency graph based on the dependency information, the dependency graph identifying dependencies between conflicting customizations in the set;
   removing any other conflicting customizations from the set that are on a dependency path between a first conflicting customization and the base software product in the dependency graph; and
   applying one of the set of conflicting customizations based on the dependency information.

2. The method of claim 1 wherein generating a dependency graph comprises: identifying the dependency information within each of the conflicting customizations.

3. The method of claim 1 wherein generating a dependency graph comprises: generating the dependency structure prior to running the software product.

4. The method of claim 1 wherein generating a dependency graph comprises: generating the dependency structure while running the software code.

5. The method of claim 1 wherein applying one of the conflicting customizations comprises: applying all the conflicting customizations in reverse-dependency order along the dependency path.

6. The method of claim 1 and further comprising: prior to applying, resolving any remaining conflicts between conflicting customizations.

7. A system for customizing a software product, comprising:
   a memory storage device; and
   a processing unit coupled to the memory storage device, wherein the processing unit is operative to:
      store a set of conflicting customizations to the software product and dependency information indicating a dependency among conflicting customizations in the set;
      generate a dependency graph based on the dependency information, the dependency graph identifying dependencies between conflicting customizations in the set;
      remove any other conflicting customizations from the set that are on a dependency path between a first conflicting customization and the base software product in the dependency graph; and
      apply one of the set of conflicting customizations based on the dependency information.

8. The system of claim 7 wherein the processing unit is further operative to: identify a first conflicting customization in the set located at one end of a dependency path in the dependency graph.

9. The system of claim 7 wherein the processing unit is further operative to: identify any other conflicting customizations between the first conflicting customization and base software product along the dependency path and to remove the other conflicting customizations from the set.

10. The system of claim 7 wherein the processing unit is further operative to: resolve any remaining conflicts between conflicting customizations in the set.

11. The system of claim 7 wherein the processing unit is further operative to: generate the dependency graph as a directed acyclic graph with the conflicting customizations as nodes in the directed acyclic graph.

12. A non-transitory computer readable medium storing computer executable instructions which, when executed by a computer, cause the computer to perform a method comprising:
   obtaining a set of conflicting customizations to be made to a same element of the base software product;
   accessing dependency information associated with each of the conflicting customizations in the set, the dependency information identifying a product upon which the associated conflicting customization is based;
   generating a dependency graph based on the dependency information, the dependency graph identifying dependencies between conflicting customizations in the set:
   removing any other conflicting customizations from the set that are on a dependency path between a first conflicting customization and the base software product in the dependency graph; and
   applying one of the set of conflicting customizations based on the dependency information.

13. The non-transitory computer readable medium of claim 12 wherein the method comprises:

applying customizations to the software product based on a location of the customizations in the dependency structure.

14. The non-transitory computer readable medium of claim 13 wherein applying customizations comprises: preferentially applying a dependent customization relative to a parent customization on which the dependent customization depends.

15. The non-transitory computer readable medium of claim 12 wherein the method comprises: resolving conflicts between the customizations.

16. The non-transitory computer readable medium of claim 12 wherein the steps of obtaining, accessing and generating are performed prior to running the software product.

* * * * *